United States Patent Office 3,631,004
Patented Dec. 28, 1971

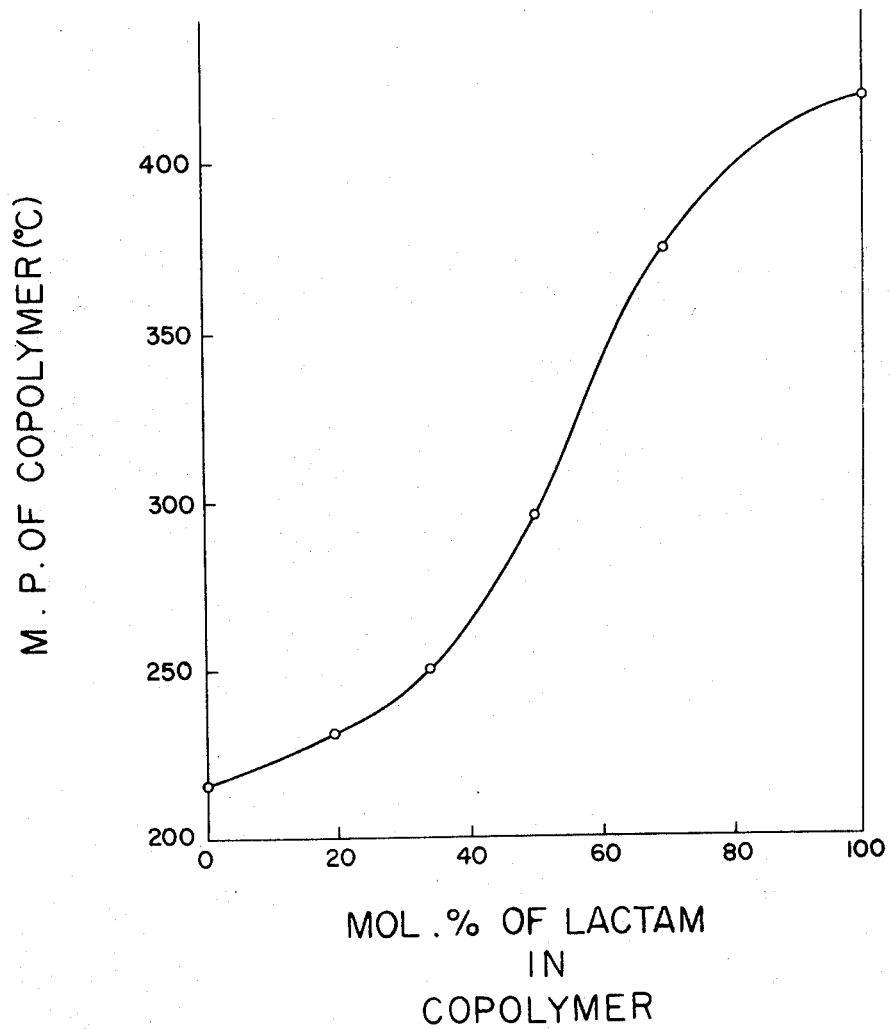

3,631,004
PROCESS FOR THE PRODUCTION AND THE RING-OPENING POLYMERIZATION OF 3-AZABICYCLO (3,2,2)NONANONE - 2 AND THE POLYAMIDE OBTAINED THEREBY
Shinpei Gomi, Tokyo, Shigeyuki Suzuki, Kanagawa-ken, and Hitoshi Takita, Masaaki Takahashi, and Kiro Asano, Tokyo, Japan, assignors to Kureha Kagaku Kogyo Kabushiki Kaisha, Tokyo, Japan
Filed Dec. 20, 1968, Ser. No. 785,557
Claims priority, application Japan, Dec. 28, 1967, 43/83,676; Dec. 29, 1967, 43/84,712, 43/84,713
Int. Cl. C08g 20/10, 20/12
U.S. Cl. 260—78 L                    12 Claims

ABSTRACT OF THE DISCLOSURE

This invention is a process for producing 3-azabicyclo (3,2,2) nonanone-2 by reacting nitrosyl surfuric acid with bicyclo (2,2,2) octane-2-carboxylic acid in presence of fuming sulfuric acid, process for polymerizing 3-azabicyclo (3,2,2) nonanone-2 or for copolymerization 3-azabicyclo (3,2,2) nonanone with $\epsilon$-caprolactam, and polyamides and copolyamides obtained thereby.

This invention relates to the production of a polyamide by the ring-opening polymerization of 3-azabicyclo (3,2,2) nonanone-2 (which shall be called lactam A hereinafter) and to the production of copolyamide by the ring-opening copolymerization of lactam A and $\epsilon$-caprolactam.

As a result of researches made by the present inventors on the polymerization of lactam A, it has been found that lactam A is very high in the polymerizability, polymerizes easily in the presence of a catalyst used generally for the polymerization of $\epsilon$-caprolactam and gives a polymer at a high yield and that further surprisingly the polymer shows such high melting point as 415° C. with decomposition. This polymer is soluble in sulfuric acid or formic acid. Tough transparent films and fibers are obtained easily from its formic acid solution and are so high in the melting point and secondary transition point as to be particularly high in the form stability against heat.

A polyamide similar to this has been heretofore synthesized by the condensation reaction of 4-aminomethyl-cyclohexane carboxylic acid (U.S. Pat. 2,910,457). However, the type of this polymerization is a condensation type and not the ring opening one. In this polycondensation the isomerization of the cis monomer to the trans will occur during the polymerization and, as a result, a polyamide having more than 75% of a trans structure will be obtained. On the other hand, as the polyamide obtained by the present invention is synthesized by the ring-opening polymerization of lactam A, the proportion of the trans structure is less than 65% and its properties are different from those of the polyamide obtained heretofore from 4-aminomethylcyclohexane carboxylic acid. Further, the producing method according to the present invention is a ring-opening polymerization, is therefore different from the condensation polymerization method and does not require to remove such large amount of water as is produced by the condensation reaction during the polymerization. This fact further makes a monomer casting possible. It is possible thereby to obtain a polyamide molding having a high heat resistance. Further, a homopolymer of lactam A is so high in the melting point as to be difficult to mold. However, the present inventors have discovered that, by ring opening copolymerization of lactam A with $\epsilon$-caprolactam, it is further possible to obtain a melt moldable copolymer having the following very excellent properties. Generally, in the copolymerization, the crystallinity is lower than the crystallinity of each homopolymer. This reduction of the crystallinity reduces the melting point of the polymer and, in some case, reduces the Young's modulus of the fibers obtained from this polymer. The polymer obtained by the present invention is a copolymer but retains a high crystallinity, shows no melting point reduction, is high in the melting point, is high in the thermostability, light stability and transparency and shows a high secondary transition point and high Young's modulus. Furthermore, this polymerization reaction is found to be very small in the amount of the residual monomer and oligomer often problematical in the case of the polymerization of $\epsilon$-caprolactam and, as it is a ring opening polymerization, a monomer casting is possible.

The lactam A to be used in the present invention can be synthesized by the following process. At first, bicyclo (2,2,2) octane-2-carboxylic acid is synthesized by hydrogenating bicyclo (2,2,2)-5-octene-2-carboxylic acid synthesized easily by the addition reaction of 1,3-cyclohexadiene and acrylic acid and then lactam A is obtained at a high yield by the reaction of bicyclo (2,2,2) octane-2-carboxylic acid with nitrosyl sulfuric acid in the presence of fuming sulfuric acid.

In working the present invention, there can be used such catalysts used generally for the polymerization of $\epsilon$-caprolactam as water, amino acid, acetic acid or phosphoric acid. However, particularly, it is preferable to use such alkali or alkaline earth metal as Na, K, Li or Ca or such metallic hydride as NaH, KH, $CaH_2$ or $LiAlH_4$. The above mentioned catalyst is added in a range of 0.01 to 10% by weight but is used preferably in 0.02 to 3.0% by weight. The polymerization is carried out at a temperature of 150 to 350° C.

Further, in the present invention, lactam A can be copolymerized at any proportion with $\epsilon$-caprolactam. Particularly, in order to obtain a coplymer which can be melt-molded and is excellent in the properties, it is preferable to carry out the copolymerization reaction with the amount of lactam A in a range of 5 to 55 mol percent. That is to say, in order to elevate the melting point of a copolymer of $\epsilon$-caprolactam by a copolymerization, to improve its transparency or to elevate the glass transition temperature of the copolymer, such copolymer as contains at least 5 mol percent lactam A is preferable. On the other hand, a copolymer containing more than 55 mol percent lactam A is so high in the melting point as to be difficult to melt-mold. However, the above mentioned range is nothing limiting the scope of this patent.

The copolymer of $\epsilon$-caprolactam and lactam A as obtained by the present invention always gives a copolymer having a melting point higher than the melting point of a homopolymer of $\epsilon$-caprolactam. As shown in FIG. 1, the with increase of the amount of lactam A contained in the copolymer, its melting point becomes gradually higher from around 215° C. which is the melting point of nylon-6 (poly $\epsilon$-caprolactam). That is to say, in case the amount of lactam A in the copolymer was 35 mol percent, its melting point showed 250° C. and a copolymer containing 50 mol percent lactam A showed a melting point of 320° C. In case the amount of lactam A exceeded 90 mol percent, the melting point of the copolymer showed more than 400° C.

Further, as a result of its X-ray analysis, it was recognized that, even when the amount of lactam A became more than 50 mol percent, it still retained a sufficient crystallinity. It can be said that lactam A is a very excellent comonomer which can elevate the melting point of the copolymer while retaining the crystallinity.

When the glass transition temperature of the obtained copolymer was determined from viscoelastic measurement by vibron II, the glass transition temperature of either copolymer was found to be higher than the glass transition temperature of nylon-6 (about 40–60° C.) and the copolymer containing 50 mol percent) of the lactam A component surprisingly showed a glass transition temperature around 160° C. This shows that this copolymer is not only high in the melting point but is also very excellent in the thermal properties and can be said to be a great feature of this comonomer.

Further, it has been discovered that the fibers obtained from this copolymer are high in the transparency, the light stability in which nylon-6 is considered to be short and high in the Young's modulus. It is possible to make from this copolymer not only fibers but also transparent films, filaments and useful polyamide moldings by injection-, extrusion- or pressure-molding. It is adapted particularly for machine parts and electric parts of high heat-resistance.

It is adapted also particularly for the production of pipes of large diameters and other large moldings by monomer casting. This can be counted as one of the greatest features of this polymerization.

As in the above, it has been found that lactam A easily homopolymerizes and also copolymerizes at any proportion with $\epsilon$-caprolactam, that, in such case, the polymer has low contents of the residual monomer and oligomer and shows a melting point higher than that of a homopolymer of $\epsilon$-caprolactam and that there is obtained a crystalline copolyamide high in the transparency. It has also been found that, by shaping, the above copolymer gives a chemically stable polyamide high in the thermostability and mechanical strength and gives a resin adapted for many machine parts, electric parts and tire cords. The above shall be explained with the following examples.

EXAMPLE 1

Lactam A used in the copolymerization with $\epsilon$-caprolactam was synthesized by the following process. 154 g. of bicyclo (2,2,2) octane-2-carboxylic acid synthesized from 1,3-cyclohexadiene and acrylic acid were dissolved in 1 liter of cyclohexane and a mixed solution of 320 g. of 30% fuming sulfuric acid and 145 g. of nitrosyl sulfuric acid was dropped into the solution at 70° C. under stirring. The reaction was continued for about 40 minutes, then the contents were poured into 2 kg. of ice, the cyclohexane was separated and then the solution was made alkaline with a 20% sodium hydroxide solution while being kept at 0° C. and was extracted with chloroform. The chloroform was evaporated and the thus obtained crude lactam was refined through hydrochloride to obtain 72 g. of lactam A of M.P. 165 to 166° C.

EXAMPLE 2

30 g. of lactam A and 3% by weight of water were put into a glass ampoule and the ampoule was sealed under nitrogen. Then this ampoule was heated at 260° C. for 2 hours and was further heated at 280° C. for 5 hours under the normal pressure. When the viscosity of the obtained polymer was measured in sulfuric acid at 20° C., the relative viscosity of a solution of 1% by weight of the polymer was 4.0. This polymer was dissolved in 90% formic acid. This solution was cast on a glass plate and was then heated at 110° C. to obtain a transparent tough film. The melting point determined from the differential thermal analysis of this polymer was 415° C. (with decomposition). As a result of viscoelastic measurement by vibron II, it was found that the secondary transition temperature was more than 200° C. Further, when this polymer was extracted in 1 liter of boiling water for 6 hours, substantially no residual monomer and oligomer were detected. From the measurement by the nuclear magnetic resonance, the ratio of the trans structure in the polymer was found to be 60%. When the Young's modulus of the film produced from this polymer was measured with an Instrom, a value of 800 kg./mm.$^2$ was obtained.

EXAMPLE 3

30 g. of lactam A put into a cylindrical glass mold were heated at 175° C. under nitrogen to be uniformly melted. Then about 0.06% by weight of sodium dispersed in xylene was added to the melt and the temperature was elevated to 230° C. The polymerization was completed in 5 minutes to obtain a solid polymer. When this mold was cooled to the room temperature and the polymer was taken out, there was obtained a cylindrical molding 2 cm. in the diameter and 8.3 cm. long. When the viscosity of this polymer was measured in sulfuric acid at 20° C., the relative viscosity of a solution of 1% by weight of the polymer was 5.1.

EXAMPLE 4

40 g. of lactam A and 80 g. of $\epsilon$-caprolactam and 1.0% by weight of water and 0.12% by weight of acetic acid on the total weight of both monomers were put into an autoclave under nitrogen. The autoclave was heated at 260° C. for 8 hours in the sealed system and were further heated at a temperature of 280° C. for 8 hours under the normal pressure. Then the produced polymer was taken out of the autoclave. This polymer showed a value of a relative viscosity of 5.4 at 20° C. at a concentration of 1% by weight in 96% sulfuric acid. Further, this polymer was crushed, was boiled for 2 hours in a sufficient amount of 0.5% aqueous formic acid solution was then filtered and washed, was again boiled for 6 hours with the addition of water and was then separated by filtration and dried. When the amount of the residual monomer and oligomer was measured, it was less than 5%. The secondary transition temperature determined from the viscoelastic measurement by vibron II was found to be around 110° C. Further, when the Young's modulus of samples prepared by stretching these fibers to be 4.4 times as long at 120° C., was determined by using an Instron, such high value as 400 to 600 kg./mm.$^2$ was shown. On the other hand, the Young's modulus of nylon is 150 to 250 kg./mm.$^2$. Furthermore, the above stretched yarn of the copolyamide were transparent and high in crystallinity, as shown by the X-ray analysis.

When the light-stability of the stretched yarn was measured with a Fado-O-Meter, the tenacity retaining percent of the yarn after the irradiation for 80 hours was 83%, showing a value considerably higher than 40 of nylon-6 yarns.

EXAMPLE 5

14 g. of lactam A and 17 g. of $\epsilon$-caprolactam were put into a glass ampoule under nitrogen and were heated at 120° C. to be uniformly melted. Then 0.08% by weight of sodium dispersed in xylene was added to the melt and the temperature was elevated to 230° C. The polymerization was completed in 10 minutes to obtain a solid polymer. When the viscosity of this polymer was measured in sulfuric acid at 20° C., the relative viscosity of a solution of 1% by weight of the polymer was 6.7. On the other hand, the melting point determined by the differential thermal analysis was shown to be 260° C. When the amount of the residual monomer and oligomer was measured according to the process of the above mentioned Example 4, it was less than 4%. This polymer dissolved in formic acid and the cast film obtained from it was transparent. When this film was analyzed with X-rays, it was found to be crystalline. Further, from the result of viscoelastic measurement by vibron II of this film, the secondary transition temperature was found to be around 140° C.

When the polymerization was carried out in the same way in a mold, a molding having the above mentioned properties was obtained.

EXAMPLE 6

When a mixture of 14 g. of lactam A and 17 g. of $\epsilon$-caprolactam was polymerized at 220° C. under nitrogen in the presence of 0.3% by weight of lithium aluminum hydride for 20 minutes, a polymer of a melting point of 260° C. was obtained.

EXAMPLE 7

70 g. of lactam A and 57 g. of ε-caprolactam with the addition of 1.0% by weight of water on the total weight of both monomers were heated at 300° C. for 5 hours in a nitrogen atmosphere in an autoclave. Then, the temperature of the autoclave was elevated to 330° C., the polymer was immediately taken out of the autoclave and the viscosity of the obtained polymer was measured in sulfuric acid. Then the relative viscosity at 20° C. at a concentration of 1% by weight was 7.0. Further, this polymer showed a melting point of 320° C. and was found as a result of its X-ray analysis to be crystalline. The secondary transition temperature by the viscoelastic measurement by vibron II was 160° C.

What we claim is:

1. A proces for producing a film or fiber forming polyamide by ring-opening polymerization of 3-azabicyclo (3,2,2) nonanone-2 in the presence of a catalyst selected from the group consisting of water, water and acetic acid, alkali metal, alkaline earth metal and alkali metal hydride and alkaline earth metal hydride.

2. A process according to claim 1 wherein the catalyst is present in an amount of a 1 to 10% by weight monomer.

3. A process according to claim 2 wherein the catalyst is water.

4. A process according to claim 2 wherein the catalyst is water and acetic acid.

5. A process according to claim 1 wherein the catalyst is present in an amount of 0.1 to 3% by weight.

6. A process according to claim 5 wherein the catalyst is alkali metal.

7. A process according to claim 5 wherein the catalyst is alkali metal hydride.

8. A process according to claim 1 wherein the polymerization is carried out at a temperature of 150 to 350° C.

9. A process according to claim 10 wherein the 3-azabicyclo (3,2,2) nonanone-2 is produced by reacting nitronyl sulfuric acid on bicyclo (2,2,2) octane -2-carboxylic acid in the presence of fuming sulfuric acid.

10. A process for producing a film or fiber forming copolyamide by ring-opening copolymerization of 3-azabicyclo (3,2,2) nonanone-2 and ε-caprolactam in the presence of a catalyst selected from the group consisting of water, water and acetic acid, alkali metal, alkali earth metal and alkali metal hydride and alkali earth metal hydride.

11. A process according to claim 10 wherein the catalyst is present in an amount of a 1 to 10% by weight monomer.

12. A process according to claim 10 wherein the polymerization is carried out at a temperature of 150 to 350° C.

References Cited

UNITED STATES PATENTS 2,910,457   10/1959   Temin et al. _____ 260—78 L

FOREIGN PATENTS 899,687   6/1962   Great Britain _____ 260—78 L
955,273   4/1964   Great Britain _____ 260—78 L WILLIAM H. SHORT, Primary Examiner L. M. PHYNES, Assistant Examiner